US012783755B2

(12) United States Patent
Kim et al.

(10) Patent No.: US 12,783,755 B2
(45) Date of Patent: Nov. 3, 2026

(54) SIMULATION SYSTEM AND COMPUTER READABLE RECORDING MEDIUM FOR DETERMINING SILICON LOSS

(71) Applicant: Samsung Electronics Co., Ltd., Suwon-si (KR)

(72) Inventors: Seung Hyun Kim, Seoul (KR); Joo Hyun Jeon, Hwaseong-si (KR); Jae Seong Park, Seoul (KR); Sung Jin Kim, Hwaseong-si (KR); Sung Duk Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1091 days.

(21) Appl. No.: 17/724,340

(22) Filed: Apr. 19, 2022

(65) Prior Publication Data

US 2023/0031793 A1 Feb. 2, 2023

(30) Foreign Application Priority Data

Jul. 30, 2021 (KR) ........................ 10-2021-0100639
Oct. 1, 2021 (KR) ........................ 10-2021-0130560

(51) Int. Cl.
*G06F 30/23* (2020.01)
*G06F 30/20* (2020.01)
(Continued)

(52) U.S. Cl.
CPC .............. *G06F 30/23* (2020.01); *G06F 30/20* (2020.01); *G06F 30/30* (2020.01); *G06F 30/00* (2020.01);
(Continued)

(58) Field of Classification Search
None
See application file for complete search history.

(56) References Cited

U.S. PATENT DOCUMENTS 8,457,932 B2 6/2013 Langemyr et al.
9,208,270 B2 12/2015 Fontes et al.
(Continued)

FOREIGN PATENT DOCUMENTS

JP 2007-214407 A 8/2007
JP 4350818 B2 10/2009
(Continued)

OTHER PUBLICATIONS

Schuster, Jonathan. "Advanced numerical modeling and hybridization techniques for third-generation infrared detector pixel arrays." PhD diss., Boston University, 2014. (Year: 2014).*
(Continued)

*Primary Examiner* — Ryan F Pitaro
*Assistant Examiner* — Simeon P Drapeau
(74) *Attorney, Agent, or Firm* — Fish & Richardson P.C.

(57) ABSTRACT

A simulation system is provided. The simulation system comprises a processor, and a storage to store a simulation program that, when executed by the processor, causes the processor to, use a finite difference method (FDM) to calculate heat energy data generated by light energy provided to a simulation domain, receive the calculated heat energy data and use a finite-element method (FEM) to calculate temperature change data of the simulation domain over time and calculate phase change data of the simulation domain over time, and calculate a silicon loss of the simulation domain using the calculated temperature change data and the calculated phase change.

20 Claims, 18 Drawing Sheets

(51) Int. Cl.
*G06F 30/30* (2020.01)
*G06F 30/00* (2020.01)
*G06F 111/10* (2020.01)
*G06F 119/08* (2020.01)

(52) U.S. Cl.
CPC ....... *G06F 2111/10* (2020.01); *G06F 2119/08* (2020.01)

(56) References Cited

U.S. PATENT DOCUMENTS

| | | | | |
|---|---|---|---|---|
| 10,650,177 | B2 | 5/2020 | Bertilsson et al. | |
| 2010/0250212 | A1 * | 9/2010 | Velazquez Lopez ... | G06F 30/15 703/8 |
| 2012/0012170 | A1 | 1/2012 | Foss et al. | |

FOREIGN PATENT DOCUMENTS

| | | | |
|---|---|---|---|
| JP | 4784192 | B2 | 10/2011 |
| JP | 2021-075403 | A | 5/2021 |

OTHER PUBLICATIONS

Vergura, Silvano, Giuseppe Acciani, and Ottavio Falcone. "A finite-element approach to analyze the thermal effect of defects on silicon-based PV cells." IEEE Transactions on Industrial Electronics 59, No. 10 (2011): 3860-3867. (Year: 2011).*

Malherbe, Johan B. "Diffusion of fission products and radiation damage in SiC." Journal of Physics D: Applied Physics 46, No. 47 (2013): 473001. (Year: 2018).*

Adeagbo, Waheed A., Martin Hoffmann, Arthur Ernst, Wolfram Hergert, Minnamari Saloaro, Petriina Paturi, and Kalevi Kokko. "Tuning the probability of defect formation via substrate strains in Sr 2 FeMoO 6 films." Physical Review Materials 2, No. 8 (2018): 083604. (Year: 2018).*

Eriguchi, Koji, Akira Ohno, Daisuke Hamada, Masayuki Kamei, and Kouichi ONo. "Estimation of defect generation probability in thin Si surface damaged layer during plasma processing." Thin Solid Films 516, No. 19 (2008): 6604-6608. (Year: 2008).*

Plekhanov, P. S., U. M. Gosele, and T. Y. Tan. "Modeling of nucleation and growth of voids in silicon." Journal of applied physics 84, No. 2 (1998): 718-726. (Year: 1998).*

Raghavan, Ashwin S. Laser-fired contact formation on metallized and passivated silicon wafers under short pulse durations. The Pennsylvania State University, 2014. (Year: 2014).*

R.F. Wood, et al. "Macroscopic theory of pulsed-laser annealing. I. Thermal transport and melting" Physical Review B, vol. 23, No. 6, pp. 2923-2942 (1981).

M. Darif, et al. "Numerical Simulation of Si Nanosecond Laser Annealing by COMSOL Multiphysics" Excerpt from the Proceedings of the COMSOL Confrence, pp. 1-6 (2008).

Jacques et al., "Optimization of thermo-optic phase-shifter design and mitigation of thermal crosstalk on the SOI platform," Optics Express, Apr. 15, 2019, 27(8):10456-10471.

Office Action in Taiwanese Appln. No. 111126423, mailed on Jul. 23, 2026, 35 pages (with machine translation).

* cited by examiner

[ Si loss ]

SIMULATION SYSTEM AND COMPUTER READABLE RECORDING MEDIUM FOR DETERMINING SILICON LOSS

This application claims priority from Korean Patent Applications No. 10-2021-0100639 filed on Jul. 30, 2021 and No. 10-2021-0130560 filed on Oct. 1, 2021 in the Korean Intellectual Property Office, and all the benefits accruing therefrom under 35 U.S.C. § 119, the contents of which in its entirety are herein incorporated by reference.

BACKGROUND

Some example embodiments relate to a simulation system and/or a computer-readable recording medium.

As semiconductors become highly integrated and miniaturized, factors in each step of designing and/or fabricating a semiconductor device act in a complex way, and semiconductor devices may have various unintended electrical characteristics. Accordingly, the semiconductor industry's demand for a technology computer aided design (TCAD) process-device simulation environment is increasing to overcome the limitations of semiconductor processes and devices, understand a phenomenon, and/or reduce the cost of experiments (e.g., in-fab experiments). Alternatively, or additionally, to provide the accurate product specifications of a semiconductor device, it is necessary/desirable to simulate the semiconductor device by estimating characteristics thereof.

SUMMARY

Some example embodiments provide a simulation system for providing a semiconductor device with improved product reliability.

Alternatively, or additionally, some example embodiments provide a computer-readable recording medium including a simulation program for providing a semiconductor device with improved product reliability.

According to some example embodiments, there is provided a simulation system comprising a processor, and a non-transitory computer-readable medium configured to store a simulation program that, when executed by the processor, causes the processor to, use a finite difference method (FDM) to calculate heat energy data generated by light energy provided to a simulation domain, receive the calculated heat energy data and use a finite-element method (FEM) to calculate temperature change data of the simulation domain over time and calculate phase change data of the simulation domain over time, and calculate a silicon loss of the simulation domain using the calculated temperature change data and the calculated phase change.

According to some example embodiments, there is provided a simulation system comprising a processor, and a non-transitory computer-readable medium configured to store a simulation program, wherein, when the simulation program is executed, the processor divides a simulation domain into unstructured meshes, calculates heat energy data generated by light energy provided to the simulation domain using a finite difference method (FDM), interpolates parameters of the unstructured meshes into parameters of structured meshes, calculates temperature change data and phase change data of the simulation domain over time on the basis of the heat energy data using the parameters of the meshes structured through a finite element method (FEM), and calculates a silicon loss of the simulation domain using the temperature change data and the phase change data.

According to some example embodiments, there is provided a non-transitory computer-readable recording medium including a simulation program for calculating a number of voids formed in a simulation domain and a probability of defect of the simulation domain resulting from the voids, wherein the simulation program comprises, computer-readable instructions to calculate heat energy data generated by light energy provided to the simulation domain using parameters stored in tensor meshes through a finite difference method (FDM), computer-readable instructions to interpolate the parameters stored in the tensor meshes into parameters to be stored in tetrahedral meshes, computer-readable instructions to calculate temperature change data and phase change data of the simulation domain using the calculated heat energy data and the generated parameters and stored in the tetrahedral meshes through a finite element method (FEM), computer-readable instructions to calculate a silicon loss of the simulation domain using the calculated temperature change data and the calculated phase change data, and computer-readable instructions to analyze the number of voids formed in the simulation domain and a probability of defect of the simulation domain resulting from the voids using the calculated silicon loss.

It should be noted that objects of various example embodiments are not limited to the above-described objects, and other objects which have not been described will be apparent to those of ordinary skill in the art from the following descriptions.

DETAILED DESCRIPTION OF SOME EXAMPLE EMBODIMENTS

Hereinafter, example embodiments of inventive concepts will be described with reference to the accompanying drawings.

Figure 1:
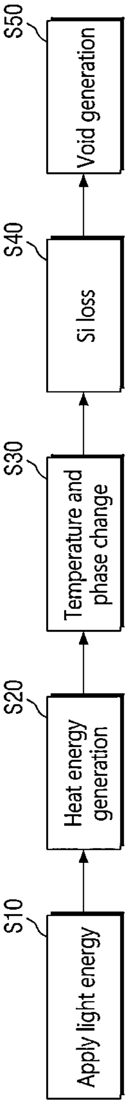
FIG. 1 is an example flowchart about annealing of a semiconductor device for illustrating a simulation according to some example embodiments.

FIG. 1 is an example flowchart about annealing of a semiconductor device for illustrating a simulation according to some example embodiments.

Referring to FIG. 1, in the case of annealing (e.g. laser-annealing) a semiconductor device, light energy may be applied to the semiconductor device (S10). Heat energy is generated in the semiconductor device by the light energy applied to the semiconductor device (S20), and the temperature and/or phase of the semiconductor device are changed due to the generated heat energy (S30). For example, the phase of the semiconductor device may change from amorphous to polycrystalline, and/or from polycrystalline to amorphous; however, example embodiments are not limited thereto.

As the temperature and phase of the semiconductor device change, silicon (Si) or individual Si atoms included in the semiconductor device may be lost in the area in which the Si has been present (S40). For example, as the temperature and/or phase of the semiconductor device change, the Si may diffuse from the area in which the Si has been present into another area adjacent thereto. For example, silicon included in a substrate area of a semiconductor device may diffuse into an insulating area (e.g. an area containing an oxide and/or a nitride) disposed on the substrate and a conductive metal area disposed on the substrate.

As the Si diffuses into other areas, voids may be formed in the area in which the Si has been present (S50). The voids generated in the semiconductor device may degrade performance of the semiconductor and may cause a short-circuit defect and/or an open-circuit defect and/or a time-dependent defect. Furthermore, it may be costly to perform various processing experiments in a fabrication environment, so as to determine an amount of or probability of or impact from various defects associated with the process parameters. Accordingly, in the case of applying light energy, such as annealing the semiconductor device, there may be an increasing necessity or desire for the simulation of voids included in the semiconductor device, so as to for example characterize various process parameters in a simulation.

Thus, a simulation system may verify performance by simulating physical characteristics and electrical characteristics of a simulation target such as a semiconductor device. As an example, a case in which the simulation target of a simulation system is a semiconductor device will be described below. However, example embodiments are not limited thereto, and the simulation system may simulate targets other than a semiconductor device.

Figure 2:
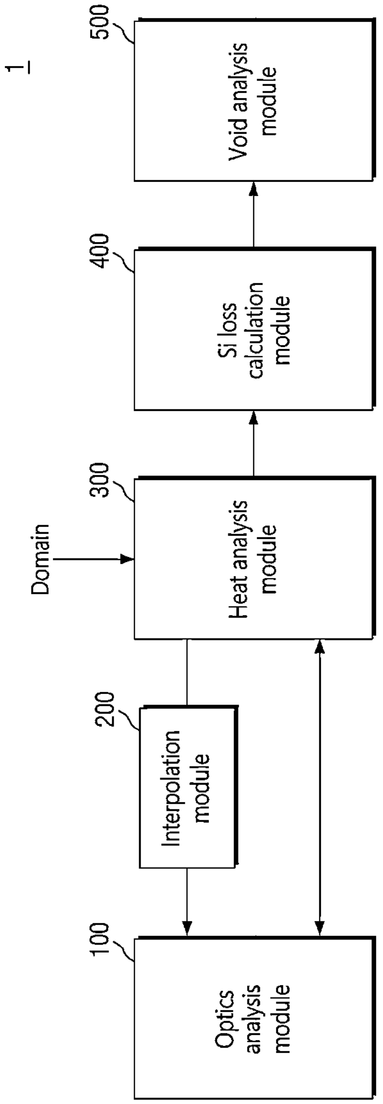
FIG. 2 is a diagram for describing a simulation system according to some example embodiments.

FIG. 2 is a diagram for describing a simulation system according to some example embodiments.

Referring to FIG. 2, a simulation system 1 includes an optical analysis module 100, an interpolation module 200, a heat analysis module 300, a Si loss calculation module 400, and a void analysis module 500. Although FIG. 2 illustrates each of the various modules 100, 200, 300, 400, and 500 as separate modules, example embodiments are not limited thereto. For example, each of the optical analysis module 100, interpolation module 200, heat analysis module 300, Si loss calculation module 400, and void analysis module 500 may include or correspond to instructions that when executed by the processor cause the processor to perform various actions, and some of the instructions for one module may be included in another module. Furthermore, as used herein a "module" may include a set of or a subset of certain specific computer-readable instructions that can cause a processor to perform various actions. Additionally, the modules may correspond to instructions such as computer-readable instructions that, when executed by a processor, cause the processor to perform various actions. The instructions may be stored in a non-transitory computer readable medium.

The simulation system 1 may receive a simulation domain to be simulated through the heat analysis module 300. The simulation domain is or includes or corresponds to a domain to be simulated by the simulation system 1 and may include a part of a semiconductor device.

The optical analysis module 100 may analyze a change in properties of the simulation domain caused by light energy applied to the simulation domain to be simulated by the simulation system 1.

The interpolation module 200 may interpolate at least one parameter used by the optical analysis module 100 and the heat analysis module 300 so that the parameter is compatibly used for each of the various modules.

The heat analysis module 300 may analyze a change in the properties caused by heat energy generated by the light energy applied to the simulation domain. For example, the heat analysis module 300 may analyze a temperature change and/or a phase change of the simulation domain caused by the heat energy.

The Si loss calculation module 400 may calculate a Si loss of the simulation domain caused by the temperature change and the phase change of the simulation domain. For example, the Si loss calculation module 400 may calculate the amount of Si diffusing into an insulating area, such as an insulating film, disposed on a substrate and/or a conductive metal area disposed on the substrate.

Figure 3:
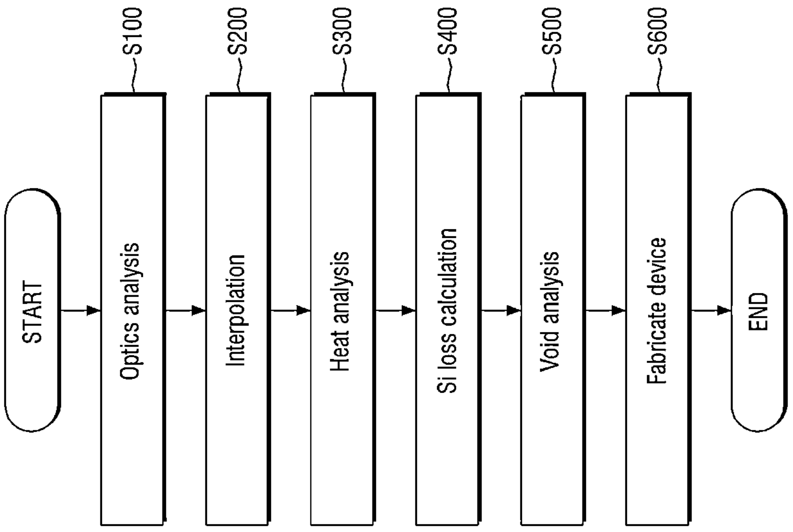
FIG. 3 is a flowchart for describing operations of a simulation system according to some example embodiments.
Figure 4:
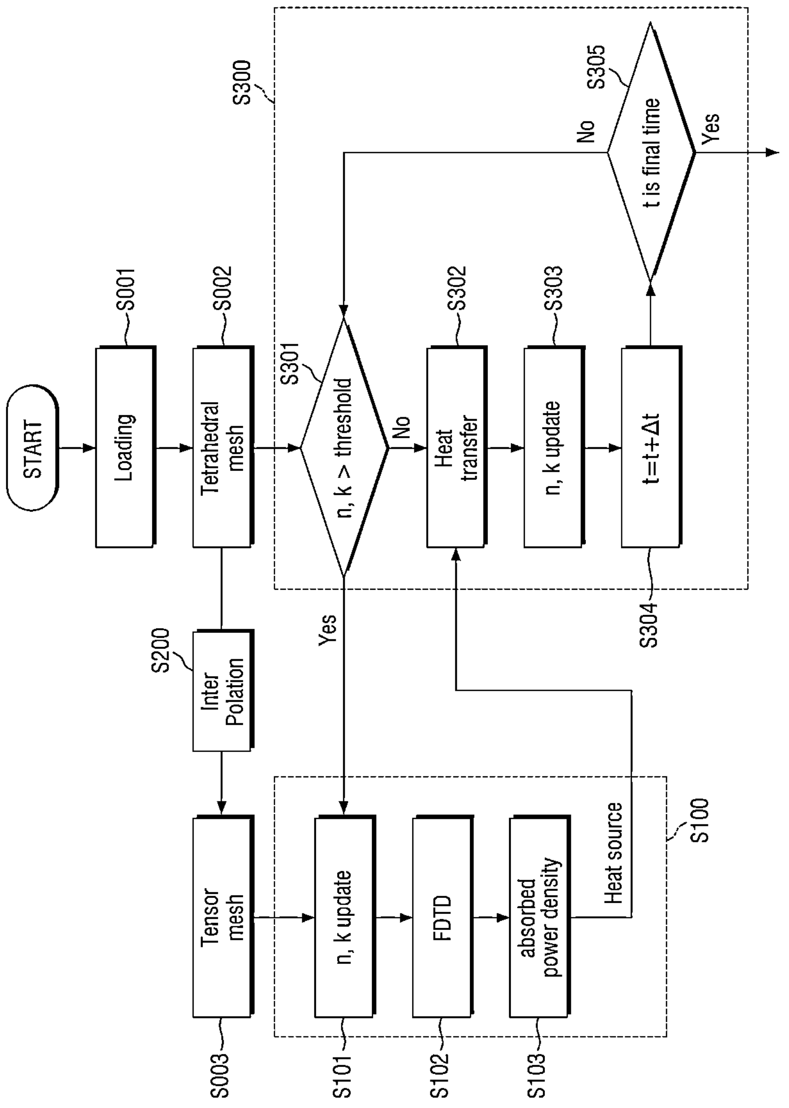
FIG. 4 is a flowchart for describing operations of an optical analysis module and a heat analysis module of a simulation system according to some example embodiments.
Figure 5:
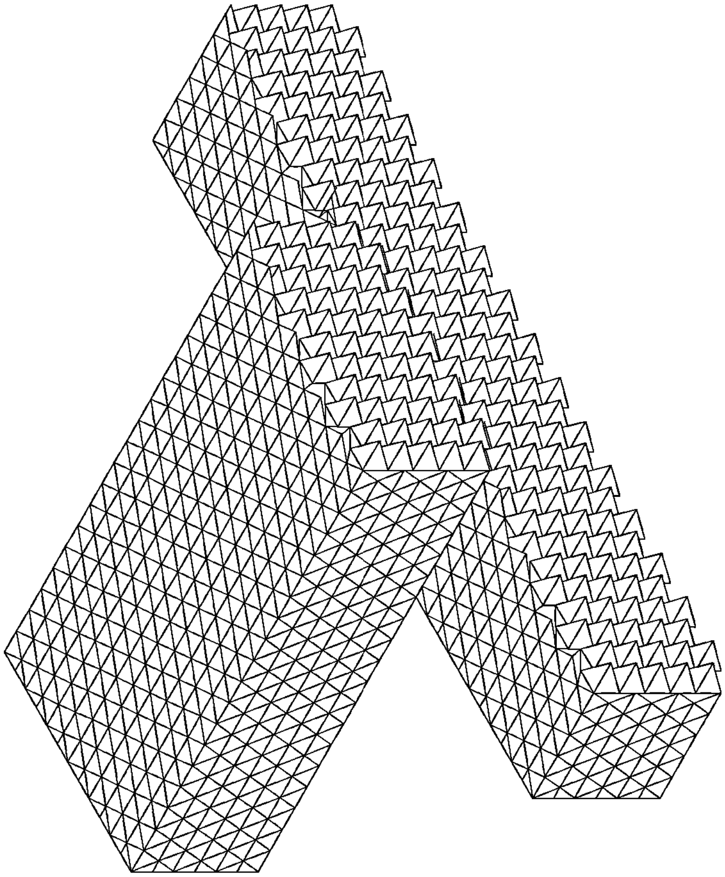
FIGS. 5 and 6 are diagrams for describing meshes used by an optical analysis module and a heat analysis module of a simulation system according to some example embodiments.
Figure 6:
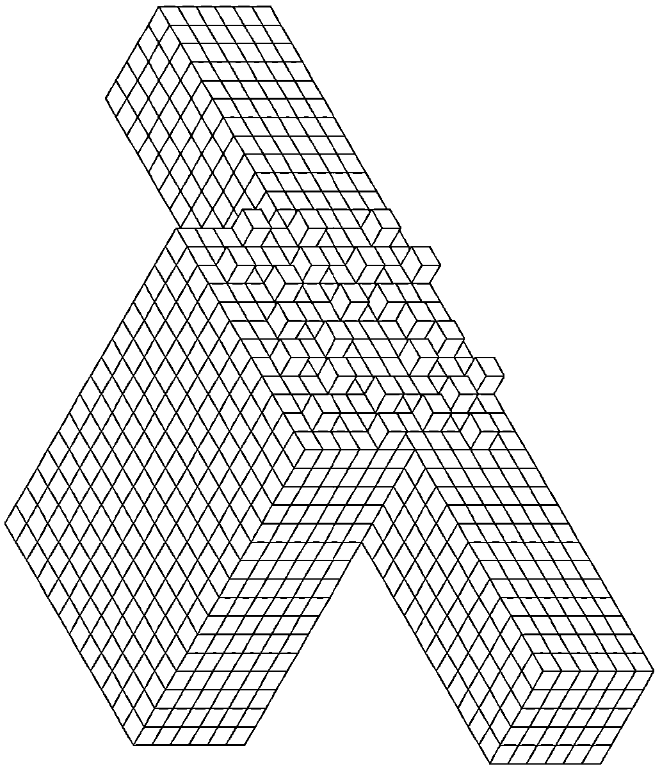
Figure 7:
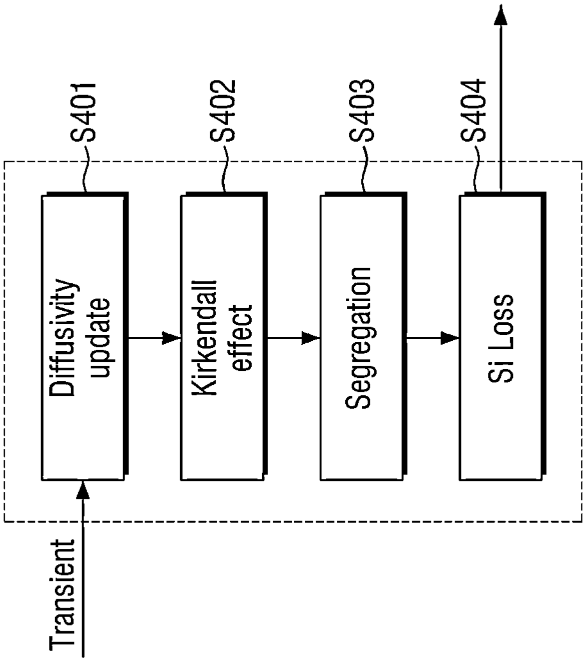
FIG. 7 is a flowchart for describing operations of a Si loss calculation module of a simulation system according to some example embodiments.
Figure 8:
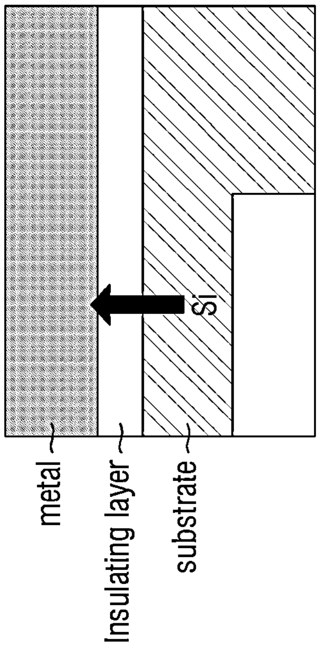
FIG. 8 is a diagram for describing a Si loss simulation through a Si loss calculation module of a simulation system according to some example embodiments.
Figure 9A:
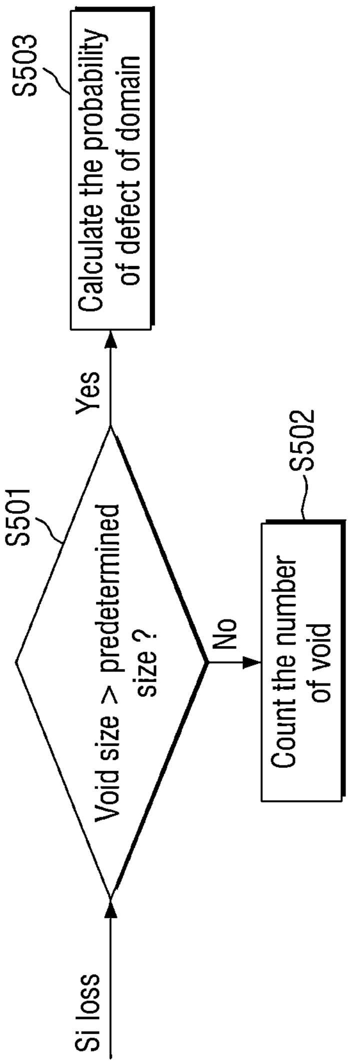
FIGS. 9A and 9B are flowcharts for describing operations of a void analysis module of a simulation system according to some example embodiments.
Figure 9B:
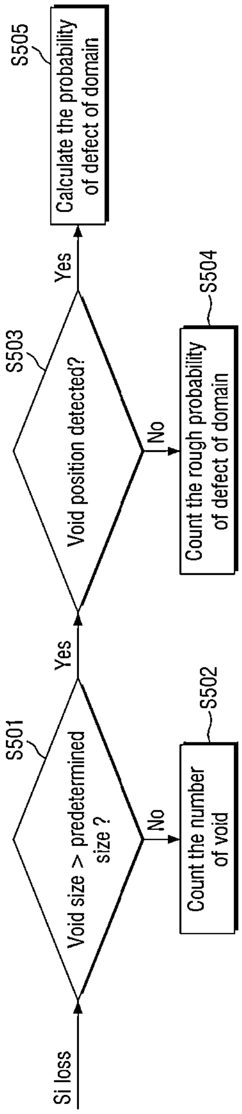

FIG. 3 is a flowchart for describing operations of a simulation system according to some example embodiments. FIG. 4 is a flowchart for describing operations of an optical analysis module and a heat analysis module of a simulation system according to some example embodiments. FIGS. 5 and 6 are diagrams for describing meshes used by an optical analysis module and a heat analysis module of a simulation system according to some example embodiments. FIG. 7 is a flowchart for describing operations of a Si loss calculation module of a simulation system according to some example embodiments. FIG. 8 is a diagram for describing a Si loss simulation through a Si loss calculation module of a simulation system according to some example embodiments. FIGS. 9A and 9B are flowcharts for describing operations of a void analysis module of a simulation system according to some example embodiments.

Referring to FIGS. 2 to 4, when a simulation operation is started, the simulation system 1 loads a simulation domain to be simulated (S001). Specifically, the simulation domain may be provided or input to the heat analysis module 300.

Subsequently, referring to FIGS. 4 and 5, the simulation system 1 divides the loaded simulation domain into meshes (S002). Specifically, the simulation system 1 may divide the loaded simulation domain into unstructured meshes. The unstructured meshes may store parameters used in the heat analysis module 300. Although not shown in the drawings, the simulation system 1 may include a mesh generation module which divides a simulation domain into meshes. There may be asymmetric components or structures within the meshes and/or within the simulation domain.

Meshes may be or may correspond to spatial grids which divide a simulation domain. Specifically, meshes may be units for spatial discretization of a simulation domain.

In some example embodiments, the unstructured meshes used in the heat analysis module 300 may include tetrahedral/simplicial meshes. The unstructured meshes may be convenient for spatially discretizing a simulation domain such as a complicated structure and a curved structure. The unstructured meshes may be used in a finite element method (FEM).

Subsequently, referring to FIGS. 2 to 4 and 6, the simulation system 1 may interpolate the unstructured meshes generated in operation S002 into structured meshes (S200). Specifically, the interpolation module 200 may interpolate the parameters stored in the unstructured meshes into parameters stored in the structured meshes. In some example embodiments, the interpolation module 200 may linearly interpolate unstructured meshes used in the heat analysis module 300 into structured meshes used in the optical analysis module 100; however, example embodiments are not limited thereto, and the interpolation module may use another interpolation method, such as but not limited to a polynomial interpolation method such as a quadratic and/or a cubic interpolation method.

In some example embodiments, structured meshes used in the optical analysis module 100 may include tensor meshes. The structured meshes may be used for simulating a simulation domain within a short time. The structured meshes may be used in a finite difference method (FDM).

Subsequently, referring back to FIGS. 3 and 4, the simulation system 1 performs optical analysis (S100).

The optical analysis module 100 may receive the structured meshes generated by the interpolation module 200 (S003). The optical analysis module 100 may simulate a heat energy change caused by light energy applied to the simulation domain using the structured meshes.

Subsequently, the optical analysis module 100 may receive a refractive index n which may depend on or be based on the intensity of the light energy applied to the simulation domain and an extinction coefficient k (S101). Specifically, the optical analysis module 100 may receive the refractive index n (e.g., a real part of a complex index of refraction) and the extinction coefficient k (e.g., an imaginary part of a complex index of refraction) from the heat analysis module 300.

Subsequently, the optical analysis module 100 may perform the FDM using the structured meshes (S102). Specifically, the optical analysis module 100 may perform a finite difference time domain (FDTD) method which is an FDM method using the structured meshes.

$$\nabla \cdot D = \rho \quad \text{[Equation 1A]}$$

$$\nabla \cdot B = 0 \quad \text{[Equation 1B]}$$

$$\nabla \times D = \frac{\partial D}{\partial t} + J \quad \text{[Equation 1C]}$$

$$\nabla \times E = -\frac{\partial B}{\partial t} \quad \text{[Equation 1D]}$$

$$E_x^n\left(i+\frac{1}{2}, j, k\right) = \frac{1-\frac{\sigma\Delta t}{2\varepsilon}}{1+\frac{\sigma\Delta t}{2\varepsilon}} E_x^{n-1}\left(i+\frac{1}{2}, j, k\right) + \quad \text{[Equation 1E]}$$

-continued $$\frac{\frac{\Delta t}{\varepsilon}}{1+\frac{\sigma\Delta t}{2\varepsilon}}(\nabla\times H)_x^{n-1/2} + J_x^{n-1/2}$$

$$E_y^n\left(i, j+\frac{1}{2}, k\right) = \frac{1-\frac{\sigma\Delta t}{2\varepsilon}}{1+\frac{\sigma\Delta t}{2\varepsilon}} E_y^{n-1}\left(i, j+\frac{1}{2}, k\right) + \quad \text{[Equation 1F]}$$

$$\frac{\frac{\Delta t}{\varepsilon}}{1+\frac{\sigma\Delta t}{2\varepsilon}}(\nabla\times H)_y^{n-1/2} + J_y^{n-1/2}$$

$$E_z^n\left(i, j, k+\frac{1}{2}\right) = \frac{1-\frac{\sigma\Delta t}{2\varepsilon}}{1+\frac{\sigma\Delta t}{2\varepsilon}} E_z^{n-1}\left(i, j, k+\frac{1}{2}\right) + \quad \text{[Equation 1G]}$$

$$\frac{\frac{\Delta t}{\varepsilon}}{1+\frac{\sigma\Delta t}{2\varepsilon}}(\nabla\times H)_z^{n-1/2} + J_z^{n-1/2}$$

$$H_x^{n+\frac{1}{2}}\left(i, j+\frac{1}{2}, k+\frac{1}{2}\right) = H_x^{n-\frac{1}{2}}\left(i, j+\frac{1}{2}, k+\frac{1}{2}\right) - (\nabla\times E)_x^n\Delta t \quad \text{[Equation 1H]}$$

$$H_y^{n+\frac{1}{2}}\left(i+\frac{1}{2}, j, k+\frac{1}{2}\right) = H_y^{n-\frac{1}{2}}\left(i+\frac{1}{2}, j, k+\frac{1}{2}\right) - (\nabla\times E)_y^n\Delta t \quad \text{[Equation 1I]}$$

$$H_z^{n+\frac{1}{2}}\left(i+\frac{1}{2}, j+\frac{1}{2}, k\right) = H_z^{n-\frac{1}{2}}\left(i+\frac{1}{2}, j+\frac{1}{2}, k\right) - (\nabla\times E)_z^n\Delta t \quad \text{[Equation 1J]}$$

$$(t = n\Delta t,\ x = i\Delta x,\ y = j\Delta y,\ z = k\Delta z,)$$

In some example embodiments, the optical analysis module 100 may simulate the light energy applied to the simulation domain using the FDTD method based on [Equation 1A] to [Equation 1J] above. In Equations 1A to 1J, D is the displacement field, ρ is the electric charge density, B is the magnetic flux density, J is the electric current density, E is the electric field, H is the magnetizing field, $E_{x,y,z}$ is the electric field in the x-, y-, or z-direction, $E^{n,n-1}$ is the electric field in the $n^{th}$, $n-1^{th}$ time period, $H_{x,y,z}$ is the magnetizing field in the x-, y-, or z-direction, $H^{n+1/2}$ and $H^{n-1/2}$ are the magnetizing field at the n+½ or n−½ time iteration step, i, j, and k are the unit vectors in the three orthogonal directions, σ is the electric conductivity, ε is electric permittivity, Δt is an increment of time for each iteration of the simulation, and n is the number of the time steps which have been iterated in the simulation.

Subsequently, as a result of the FDTD method, the optical analysis module 100 calculates a heat energy absorbed in the simulation domain due to the light energy applied to the simulation domain (S103). For example, the heat energy calculated by the optical analysis module 100 may include heat energy generated by the light energy applied to the simulation domain. The optical analysis module 100 may provide the calculated heat energy to the heat analysis module 300.

Subsequently, the simulation system 1 analyzes a temperature change and/or a phase change of the simulation domain caused by the generated heat energy (S300).

For example, the heat analysis module 300 determines whether the refractive index n and/or the extinction coefficient k and/or a function of the refractive index n and the extinction coefficient k exceed a threshold value using the unstructured meshes generated in operation S002 (S301). When either or both of the refractive index n and the extinction coefficient k, or a function thereof, exceed the threshold value, the heat analysis module 300 provides the refractive index n and the extinction coefficient k to the optical analysis module 100.

On the other hand, when either or both the refractive index n and the extinction coefficient k or a function thereof do not exceed the threshold value, the heat analysis module 300 analyzes the heat transfer phenomenon using the heat energy calculated by the optical analysis module 100 in operation S103 (S302). For example, the heat energy calculated by the optical analysis module 100 in operation S103 may be considered generated heat energy and applied to a heat transfer equation for calculation.

$$\rho C_m \frac{\partial T}{\partial t} = \nabla \cdot (\kappa_m \nabla T) + G \quad \text{[Equation 2]}$$

In Equation 2, ρ is the density, $C_m$ is the heat capacity, T is the temperature, t is the time, κ is the thermal conductivity, and G is the heat energy generated by the light energy applied to the simulation domain. In some example embodiments, the heat analysis module 300 may calculate a changed temperature of the simulation domain using [Equation 2]. For example, the heat analysis module 300 may calculate [Equation 2] by substituting the heat energy, which is calculated by the optical analysis module 100 and generated by the light energy applied to the simulation domain, for the term "G" of [Equation 2].

Subsequently, the heat analysis module 300 updates the refractive index n and/or the extinction coefficient k on the basis of the heat transfer phenomenon analysis (S303). Here, updating the refractive index n and the extinction coefficient k denotes reflecting the temperature change and the phase change of the simulation domain caused by the heat energy generated in the simulation domain.

Subsequently, the heat analysis module 300 considers a time at which the refractive index n and/or the extinction coefficient k are updated as a time at which a minute time has passed before the refractive index n and the extinction coefficient k are updated (S304) and determines whether the elapsed time is a set final time (S305). The final time may be set by a user who uses the simulation system 1; however, example embodiments are not limited thereto, and the final time may be determined or set based on other factors, and may be dynamically adjusted.

When the simulation time becomes the set final time, the heat analysis module 300 provides data regarding the temperature change and the phase change of the simulation domain to the Si loss calculation module 400. When the simulation time does not become the set final time yet, the process returns to operation S301 such that the heat analysis module 300 determines again whether the refractive index n and the extinction coefficient k exceed the threshold value.

Referring to FIGS. 2, 3, 7, and 8, the Si loss calculation module 400 updates a diffusivity of the Si in the simulation domain using the transient data regarding the temperature change and the phase change of the simulation domain calculated by the heat analysis module 300 (S401).

$$\text{Flux} = -D\nabla C \quad \text{[Equation 3A]}$$

$$D = D_0 \times \exp\left(-\frac{E_a}{k_B T}\right) \quad \text{[Equation 3B]}$$

(D: the diffusivity of Si, $E_a$: the activation energy of diffusion)

The Si loss calculation module 400 calculates the amount of Si diffusing due to the Kirkendall effect (S402). Specifically, the Si loss calculation module 400 may calculate the amount of Si diffusing from the substrate of the simulation domain into a metal area disposed on the substrate.

In some example embodiments, the Si loss calculation module 400 may calculate the amount of Si diffusing into the metal area using [Equation 3A] and [Equation 3B].

$$\text{Flux} = t(C_{max} - C_{Si}) \quad \text{[Equation 4]}$$

$$\left(t = \text{transfer rate} = t_0 \exp\left(-\frac{E_t}{k_B T}\right),\ C_{Si}\text{: interface } Si \text{ concentration}\right)$$

The Si loss calculation module 400 calculates the amount of Si (e.g., of elemental silicon) diffusing from the substrate of the simulation domain into an insulating area disposed on the substrate (S403). For example, the Si loss calculation module 400 may calculate the amount of Si loss which occurs at the interface between the substrate including Si and the insulating area including a nitride. In some example embodiments, the Si loss calculation module 400 may calculate the amount of Si diffusing into the insulating area using [Equation 4].

Subsequently, the Si loss calculation module 400 calculates the total amount of Si loss of the simulation domain by adding the amounts of Si loss calculated in operations S402 and S403 (S404).

Although FIG. 7 illustrates that the loss of Si diffusing into the metal area by the Kirkendall effect is calculated first in operation S402 and then the loss of Si diffusing into the insulating area is calculated in operation S403, example embodiments are not limited thereto. As another example, the loss of Si diffusing into the insulating area may be calculated first, and then the loss of Si diffusing into the metal area by the Kirkendall effect may be calculated. Alternatively, or additionally, the loss of Si diffusing into the metal area by the Kirkendall effect and then the loss of Si diffusing into the insulating area may be calculated in parallel, and/or may be iteratively performed.

Referring back to FIGS. 2, 3, and 9A, the simulation system 1 analyzes voids in the simulation domain (S500). For example, the void analysis module 500 of the simulation system 1 may analyze the voids in the simulation domain.

The void analysis module 500 determines whether the sizes of the voids included in the simulation domain exceed a preset/predetermined (or, alternatively, variably determined) size using the amount of Si loss calculated by the Si loss calculation module 400 (S501). The size may be set by the user who uses the simulation system 1; however, example embodiments are not limited thereto.

When the sizes of the voids do not exceed the determined size, the void analysis module 500 counts or estimates the number of voids included in the simulation domain (S502).

When the sizes of the voids exceed the determined size, the void analysis module 500 calculates or estimates the probability of defect of the simulation domain resulting from the voids included in the simulation domain (S503).

Even in the case of analyzing the voids included in the same simulation domain, targets to be analyzed in operation S502 may differ from targets to be analyzed in operation S503. For example, voids counted in operation S502 may have a different size than voids taken into consideration to calculate the probability of defect in operation S503.

Referring to FIG. 3, at some time, for example, after performing a void analysis, optionally in step S600 a semiconductor device may be fabricated based on any or all of the optics analysis S100, the interpolation S200, the heat analysis S300, the Si loss analysis S400, or the void analysis S600. The semiconductor device may be fabricated with at least one process equipment, such as at least one laser annealing equipment. The at least one laser annealing equipment may be included in the system 1 or be associated with the simulation system 1. The at least one process equipment may include or be controlled by a processor, such as the processor that performs other steps of the method described in FIG. 3. The fabrication of the semiconductor device in step S600 may or may not be performed.

Meanwhile, referring to FIG. 9B, in the case of analyzing voids in the simulation domain, the simulation system 1 may alternatively or additionally consider positions at which the voids are formed in the simulation domain.

When the sizes of the voids exceed the preset/variably determined size, the simulation system 1 determines whether the positions of the voids included in the simulation domain are detected (S503). Subsequently, when the positions of the voids in the simulation domain are not detected, the simulation system 1 calculates the rough probability of defect of the simulation domain (S504). When the positions of the voids in the simulation domain are detected, the simulation system 1 calculates the exact probability of defect of the simulation domain (S505).

For example, when the positions of the voids in the simulation domain are detectable, the accuracy of the calculated probability of defect of the simulation domain may be high. Alternatively, or additionally, the probability of defect of the simulation domain may vary depending on the positions of the voids formed in the simulation domain. For example, even when the number of voids formed in the same simulation domain is the same, positions at which the voids are formed in the simulation domain may vary. Accordingly, the probability of defect of the simulation domain may vary.

FIGS. 10 to 14 are graphs for describing a simulation of a simulation system according to some example embodiments.

Figure 10:
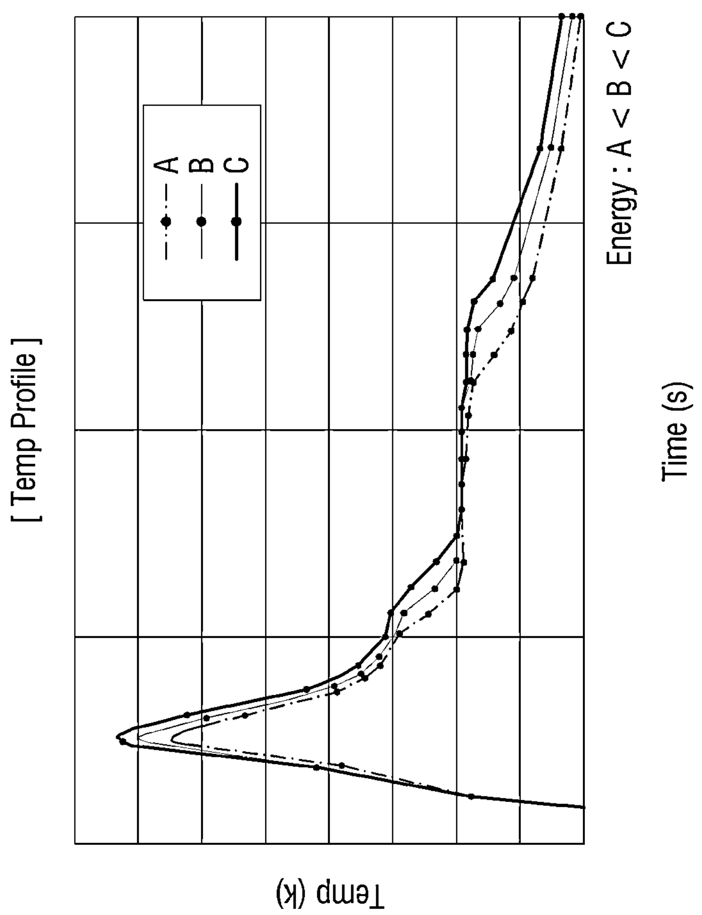
FIGS. 10 to 14 are graphs for describing a simulation of a simulation system according to some example embodiments.

Referring to FIG. 10, a temperature profile of a semiconductor device may vary depending on the magnitude of light energy (or laser energy) applied to the semiconductor device.

The simulation system 1 may calculate the temperature of a simulation domain according to the magnitude of light energy applied to the simulation domain. For example, when light energy applied to the simulation domain is increased, the temperature profile of the simulation domain rises overall. A profile B with higher light energy is seen above a profile A with the lowest light energy. Also, a profile C with the highest light energy is seen above the profile B. For example, when different magnitudes of light energy are applied to identical simulation domains and the temperatures are measured at the same time, the simulation domain to which the higher light energy is applied shows a higher temperature.

Regardless of the magnitude of light energy applied to the simulation domain, the temperatures of the simulation domains are sequentially increased and then reduced over time, maintained constant in a phase change section, and reduced again. For example, in the case of measuring temperatures of the identical simulation domains based on different magnitudes of light energy, temperature change profiles of the simulation domains may have the same shape.

Figure 11:
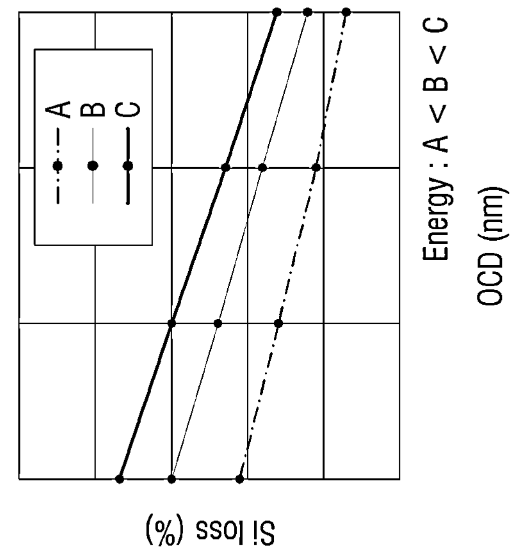
Figure 12:
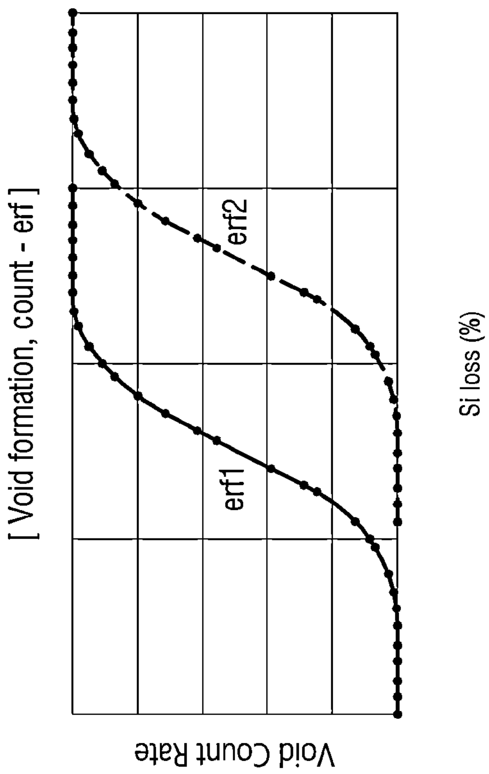

Referring to FIG. 11, the simulation system 1 may calculate a Si loss according to the optical critical dimension (OCD) of the semiconductor device. For example, as described above with reference to FIGS. 2 to 8, the Si loss calculation module 400 may calculate a Si loss according to the OCD. Here, the OCD may denote the size of the semiconductor device including the simulation domain. When the OCD is reduced, the Si loss of the simulation domain is increased.

Also, in the case of applying different magnitudes of light energy to simulation domains having the same OCD, the simulation domain to which a higher magnitude of light energy is applied shows a higher Si loss. A Si loss profile gradually increases when the lowest light energy A to the highest light energy C are applied Referring to FIG. 12, the simulation system 1 may analyze voids in the simulation domain according to Si loss of the simulation domain using an error function. For example, as described above with reference to FIGS. 2, 9A, and 9B, the void analysis module 500 may analyze voids using the error function. The error function used by the void analysis module 500 may include an error function based on a normal distribution (e.g., a Gaussian distribution).

A first error function profile erf1 may denote a profile of the number of voids in the simulation domain according to Si loss of the simulation domain. With an increase in the Si loss of the simulation domain, the number of voids in the simulation domain may increase.

A second error function profile erf2 may denote a profile of the probability of defect of the simulation domain according to the Si loss of the simulation domain. With an increase in the Si loss of the simulation domain, the probability of defect of the simulation domain may increase.

As for the same simulation domain having the same Si loss, the profile of the number of voids in the simulation domain may be higher than the profile of the probability of defect of the simulation domain. This may be because voids taken into consideration to calculate the number of voids in the simulation domain differ from voids taken into consideration to calculate the probability of defect of the simulation domain.

The voids to be analyzed in the case of calculating the number of voids in the simulation domain may include smaller voids than the voids to be analyzed in the case of calculating the probability of defect of the simulation domain. Additionally, the number of voids in the simulation domain may be calculated regardless of positions at which the voids are formed in the simulation domain.

Alternatively, in the case of calculating the probability of defect of the simulation domain resulting from voids, only voids having a specific (e.g., preset) size or larger may be considered as voids to be analyzed. Also, the probability of defect of the simulation domain resulting from voids may vary depending on positions at which the voids are formed in the simulation domain. For example, a void having the same size may be formed in identical simulation domains. Even in this case, the probability of defect may be calculated to be higher when the void is formed at a specific position.

Figure 13:
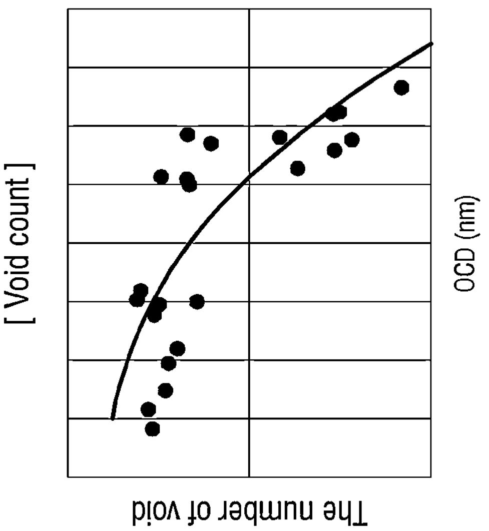

Referring to FIG. 13, the simulation system 1 may simulate or estimate the number of voids according to the OCD of the simulation domain. The number of voids in the simulation domain is reduced with an increase in the OCD of the simulation domain. For example, with a decrease in the OCD of the simulation domain, the number of voids in the simulation domain may be increased.

Figure 14:
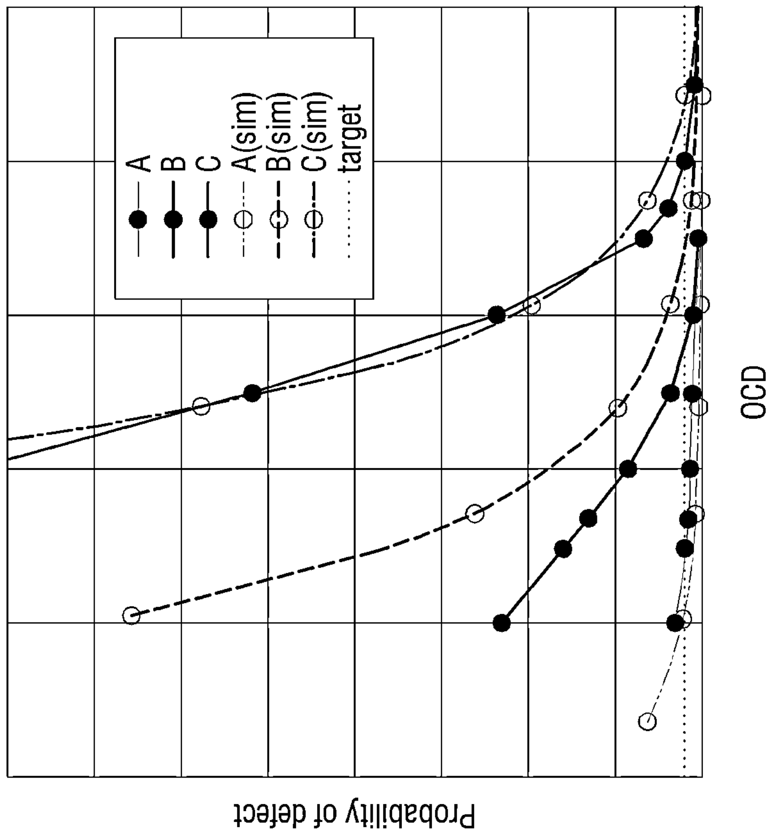

Referring to FIG. 14, the simulation system 1 may calculate or estimate the probability of defect of the simulation domain according to the OCD of the simulation domain with different magnitudes of light energy applied to the simulation domain. With an increase in the magnitude of light energy applied to the simulation domain having the same OCD, the probability of defect of the simulation domain is increased. The probability of defect of the simulation domain having the same OCD is increased in order of a case A with low light energy, a case B with intermediate light energy, and a case C with highest light energy. Also, the probability of defect of the simulation domain to which the same magnitude of light energy is applied is reduced with an increase in the OCD.

As described above with reference to FIGS. 11 to 14, the simulation system 1 may simulate changes in physical characteristics and/or electrical characteristics, such as at least one of a heat energy generated in the simulation domain and a temperature change, a phase change, the refractive index n, and the extinction coefficient k of the simulation domain, by applying light energy to the simulation domain (e.g., laser processing for annealing). The simulation system 1 may calculate the Si loss of the simulation domain by numerically and/or statistically interpreting physical characteristics and electrical characteristics and analyze voids in the simulation domain accordingly.

Figure 15:
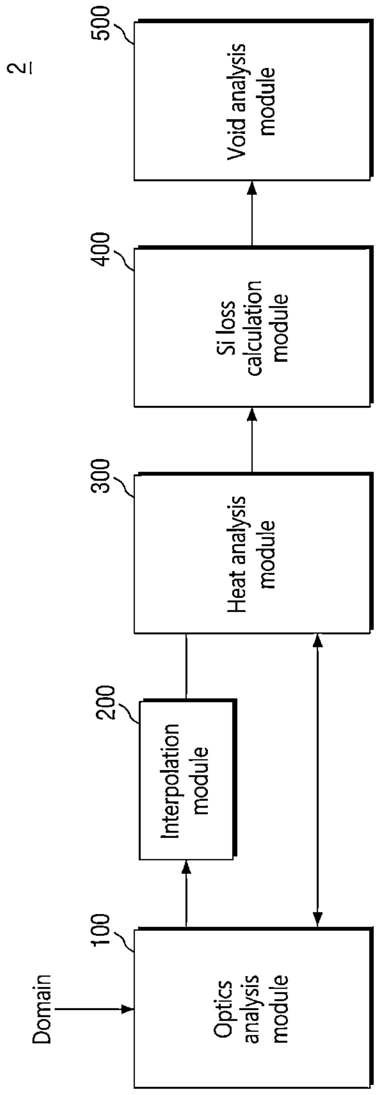
FIG. 15 is a diagram for describing a simulation system according to some other example embodiments.
Figure 16:
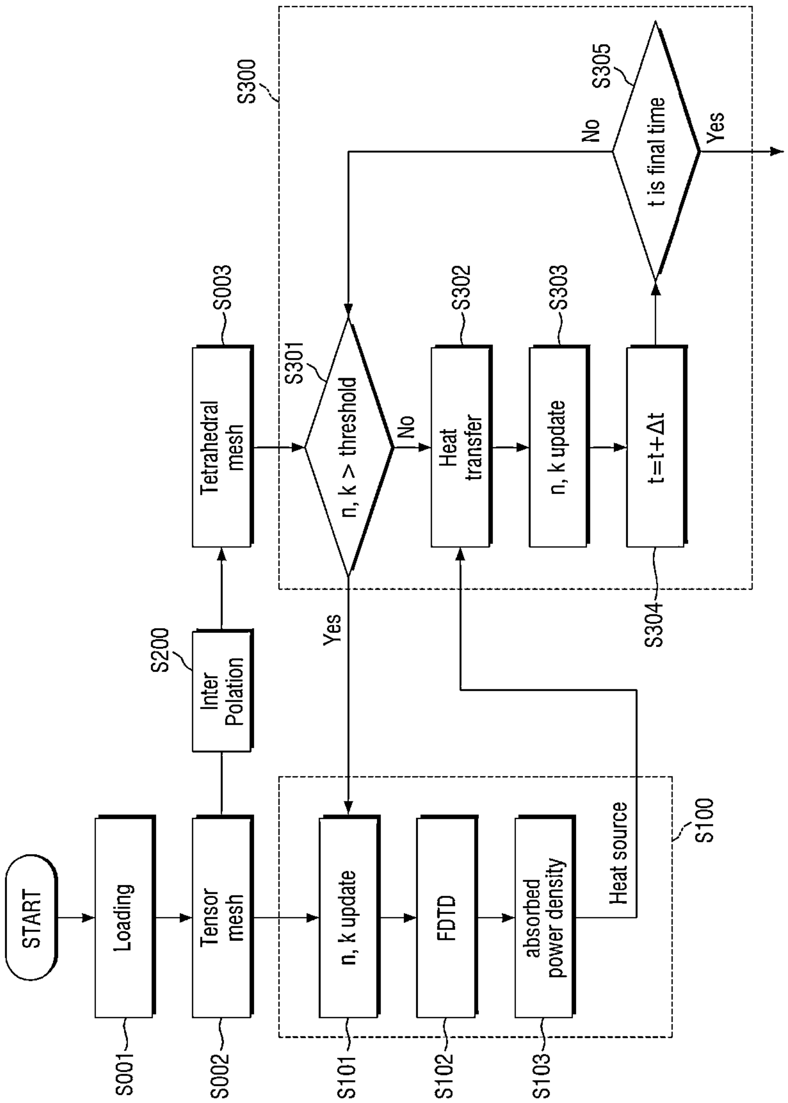
FIG. 16 is a flowchart for describing operations of an optical analysis module and a heat analysis module of a simulation system according to some other example embodiments.

FIG. 15 is a diagram for describing a simulation system according to some other example embodiments. FIG. 16 is a flowchart for describing operations of an optical analysis module and a heat analysis module of a simulation system according to some other example embodiments. For convenience of description, differences from FIGS. 1 to 14 will be mainly described.

Referring to FIGS. 15 and 16, a simulation system 2 may receive a simulation domain to be simulated through an optical analysis module 100.

When a simulation operation is started, the simulation system 2 loads the simulation domain to be simulated (S001). For example, the simulation domain may be provided and/or input to the optical analysis module 100.

Subsequently, the simulation system 2 divides the loaded simulation domain into meshes (S002). For example, the simulation system 1 may divide the simulation domain into tensor meshes. Unlike the simulation system 1 described above with reference to FIG. 2, the simulation system 2 may first generate structured meshes rather than unstructured meshes.

Subsequently, the simulation system 2 may interpolate the structured meshes generated in operation S002 into unstructured meshes (S200). Specifically, an interpolation module 200 may interpolate parameters stored in the structured meshes into parameters stored in the unstructured meshes. In some example embodiments, the interpolation module 200 may linearly interpolate structured meshes used in the optical analysis module 100 into unstructured meshes used in the heat analysis module 300.

Subsequently, as described above with reference to FIG. 2, the simulation system 2 may perform simulation operations for the simulation domain of a semiconductor device through operations S100 to S500.

Figure 17:
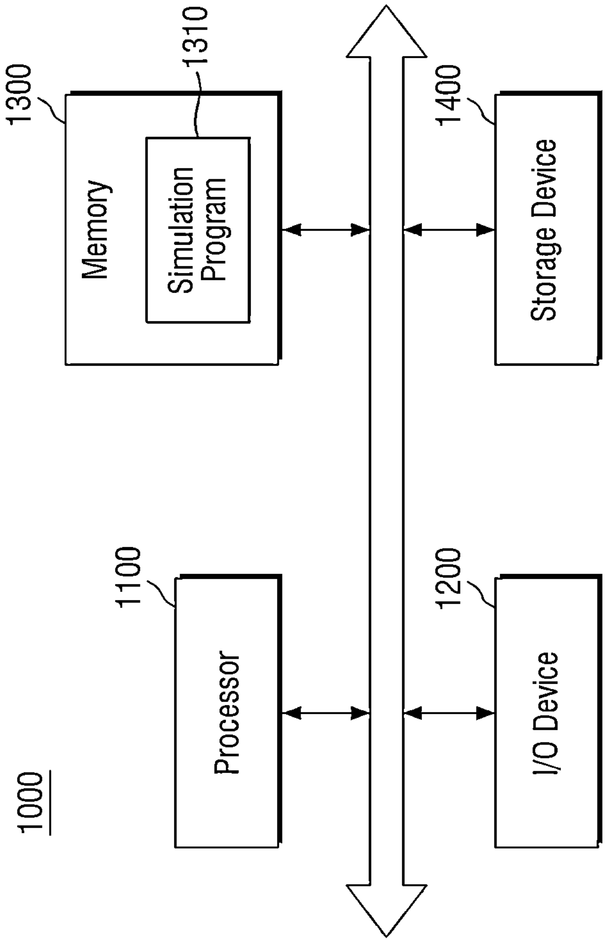
FIG. 17 is an example block diagram illustrating a computing system including a simulation system according to some example embodiments.

FIG. 17 is an example block diagram illustrating a computing system including a simulation system according to some example embodiments.

Referring to FIG. 17, a computing system 1000 including a simulation system according to some example embodiments may include at least one processor 1100, a memory 1300, an input/output (I/O) device 1200, a storage device 1400, and a bus 1900. For example, the computing system 1000 may perform the simulation operations described above with reference to FIGS. 1 to 16. In some example embodiments, the computing system 1000 may be implemented as an integrated device and referred to as an integrated circuit design device accordingly.

The computing system 1000 may be provided as a device dedicated to simulating a semiconductor device but may also be a computer for executing various simulation tools and/or design tools. The computing system 1000 may be a fixed computing system, such as a desktop computer, a workstation, or a server, or a portable computing system such as a laptop computer.

The processor 110 may be configured to execute instructions for performing at least one of various operations for simulating a semiconductor device. The processor 1100 may communicate with the memory 1300, the I/O device 1200, and the storage device 1400 through the bus 1900. The processor 110 may execute application programs loaded to the memory 1300. For example, the processor 1100 may execute a simulation program 1310 stored in the memory 1300.

The simulation program 1310 may include instructions for the computing system 1000 to perform the simulation operations described above with reference to FIGS. 1 to 16. In other words, the simulation program 1310 may simulate characteristic changes and the like of a semiconductor device caused by light energy applied to a simulation domain of the semiconductor device.

The memory 1300 may store the simulation program 1310 including instructions for simulating a semiconductor device. In addition, the memory 1300 may further store various tools such as a simulation tool. The memory 1300 may be or may include a volatile memory, such as at least one of a static random access memory (SRAM) or a dynamic RAM (DRAM), or a non-volatile memory such as a phase-change RAM (PRAM), a magnetic RAM (MRAM), a resistive RAM (ReRAM), a ferroelectric RAM (FRAM), or a flash memory.

The I/O device 1200 may control user inputs and outputs to and from user interface devices. As an example, the I/O device 1200 may include input devices, such as a keyboard, a mouse, and a touchpad, to receive integrated circuit design data. As another example, the I/O device 1200 may include output devices, such as a display and a speaker, to display simulation results and/or the like.

The storage device 1400 may store programs in a non-transitory manner, such as the simulation program 1310, and a model parameter file 1320. Before the program is executed by the processor 110, the program or at least a part thereof may be loaded to the memory 1300. The storage device 1400 may store data to be processed by the processor 1100 or data having been processed by the processor 110. For example, the storage device 1400 may store data to be processed by the simulation program 1310 and characteristic data generated by the simulation program 1310 such as the Si loss of a simulation domain and the number of voids in the simulation domain or the probability of defect of the simulation domain. The simulation program 1310 may extract electrical characteristics of a semiconductor device included in an integrated circuit on the basis of information on model parameters of the model parameter file 1320 stored in the storage device 1400.

The storage device 1400 may include a non-volatile memory, such as at least one of an electrically erasable programmable read-only memory (EEPROM), a flash memory, a PRAM, a ReRAM, an MRAM, and an FRAM, and a storage medium such as a memory card (a multimedia card (MMC), an embedded MMC (eMMC), a secure digital (SD) card, a microSD card, etc.), a solid state drive (SSD), a hard disk drive (HDD), magnetic tape, an optical disk, and a magnetic disk. Also, the storage device 1400 may be detachable from the computing system 1000 for integrated circuit design.

The bus 1900 may be a system bus for providing a network in the computing system 1000. The processor 1100, the memory 1300, the I/O device 1200, and the storage device 1400 may be electrically connected through the bus 1900 and transmit and receive data with each other. However, the configuration of the bus 1900 is not limited thereto and may further include mediation parts for efficient management.

According to some example embodiments, TCAD may be performed by using a finite difference method (FDM) to calculate heat energy data generated by light energy provided to a simulation domain, and receiving the calculated heat energy data and use a finite-element method (FEM) to calculate temperature change data of the simulation data over time and calculate phase change data of the simulation domain over time. Because the TCAD uses such methods, various defects such as melting defects may be more accurately estimated. For example, such software/systems/TCAD may be used to model the various processing parameters related to laser annealing in a more efficient manner, which may be less costly than performing various process experiments in a fabrication environment. Process parameters may be improved/optimized based on the TCAD modeling, and semiconductor devices may be fabricated based on the optimized process parameters.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc. As used herein, the term "processor" may refer to a single processor operating on one hardware, or collectively to multiple processors operating on different hardware. For example, one hardware may include a desktop and/or a server, and another hardware may include processing equipment.

It should be understood that some example embodiments described herein should be considered in a descriptive sense only and not for purposes of limitation. Descriptions of features or aspects within each example embodiment should typically be considered as available for other similar features or aspects in other embodiments. While one or more example embodiments have been described with reference to the figures, it will be understood by those of ordinary skill in the art that various changes in form and details may be made therein without departing from the spirit and/or scope as defined by the following claims.

What is claimed is:

1. A simulation system comprising:
a processor; and
a storage configured to store a simulation program that, when executed by the processor, causes the processor to
use a finite difference method (FDM) to calculate heat energy data generated by light energy provided to a simulation domain,
receive the calculated heat energy data and use a finite-element method (FEM) to calculate temperature change data of the simulation domain over time and calculate silicon phase change data of the simulation domain over time,
iteratively calculate a silicon loss of the simulation domain due to the Kirkendall effect using the calculated temperature change data and the calculated silicon phase change data, and
control at least one process equipment to fabricate a semiconductor device by adjusting, based on the calculated silicon loss, a magnitude of light energy incident on the semiconductor device.

2. The simulation system of claim 1, wherein the simulation program uses tensor meshes to calculate the heat energy data.

3. The simulation system of claim 1, wherein the simulation program uses tetrahedral meshes to calculate the temperature change data or the silicon phase change data.

4. The simulation system of claim 1, wherein the FDM includes a finite difference time domain (FDTD) method.

5. The simulation system of claim 1, wherein the simulation program is further configured to cause the processor to linearly interpolate parameters used in the FDM used during the calculating of the heat energy data into parameters used in the FEM used during the calculating of the temperature change data or the silicon phase change data.

6. The simulation system of claim 1, wherein the simulation program is further configured to cause the processor to analyze voids formed in the simulation domain by applying the calculated silicon loss to an error function.

7. The simulation system of claim 6, simulation program is configured to cause the processor to count a number of voids formed in the simulation domain.

8. The simulation system of claim 6, wherein the simulation program is configured to cause the processor to calculate a probability of defect of the simulation domain resulting from the voids formed in the simulation domain.

9. The simulation system of claim 6, wherein the simulation program is configured to cause the processor to output a result of analyzing the voids formed in the simulation domain as a numerical value.

10. The simulation system of claim 1, wherein the simulation domain comprises:
a substrate including silicon;
a metal area on the substrate; and
an insulating area on the substrate,
wherein the silicon loss includes a sum of an amount of silicon diffusing from the substrate into the metal area and an amount of silicon diffusing from the substrate into the insulating area.

11. The simulation system of claim 1, wherein the simulation domain includes an asymmetric structure.

12. A simulation system comprising:
a processor; and
a storage configured to store a simulation program,
wherein, when the simulation program is executed, the processor is configured to
divide a simulation domain into unstructured meshes,
calculate heat energy data generated by light energy provided to the simulation domain using a finite difference method (FDM),
interpolate parameters of the unstructured meshes into parameters of structured meshes, calculate temperature change data and silicon phase change data of the simulation domain over time based on the heat energy data using the parameters of the structured meshes through a finite element method (FEM), iteratively calculate a silicon loss of the simulation domain due to the Kirkendall effect using the temperature change data and the silicon phase change data, and control at least one process equipment to fabricate a semiconductor device by adjusting, based on the calculated silicon loss, a magnitude of light energy incident on the semiconductor device.

13. The simulation system of claim 12, wherein the unstructured meshes include tetrahedral meshes, and the structured meshes include tensor meshes.

14. The simulation system of claim 12, wherein the processor is configured to execute the simulation program to calculate the heat energy data using a finite difference time domain (FDTD) method of Maxwell's equations.

15. The simulation system of claim 12, wherein, when the simulation program is executed, the processor uses the silicon loss to calculates a number of voids formed in the simulation domain and a probability of defect of the simulation domain resulting from the voids.

16. The simulation system of claim 15, wherein the processor uses an error function to calculate the number of voids and the probability of defect of the simulation domain, the error function based on a normal distribution.

17. A non-transitory computer-readable recording medium including a simulation program for calculating a number of voids formed in a simulation domain and a probability of defect of the simulation domain resulting from the voids, wherein the simulation program comprises computer-readable instructions that, when executed by at least one processor, cause the at least one processor to perform operations comprising:

calculating heat energy data generated by light energy provided to the simulation domain using parameters stored in tensor meshes through a finite difference method (FDM);

interpolating the parameters stored in the tensor meshes into parameters to be stored in tetrahedral meshes;

calculating temperature change data and silicon phase change data of the simulation domain using the calculated heat energy data and the parameters stored in the tetrahedral meshes through a finite element method (FEM);

iteratively calculating a silicon loss of the simulation domain due to the Kirkendall effect using the calculated temperature change data and the calculated silicon phase change data;

analyzing the number of voids formed in the simulation domain and a probability of defect of the simulation domain resulting from the voids using the calculated silicon loss; and controlling at least one process equipment to fabricate a semiconductor device by adjusting, based on the probability of defect of the simulation domain, a magnitude of light energy incident on the semiconductor device.

18. The non-transitory computer-readable recording medium of claim 17, wherein the computer-readable instructions to analyze the number of voids includes instructions to calculate the number of voids and the probability of defect of the simulation domain using an error function based on a normal distribution.

19. The non-transitory computer-readable recording medium of claim 17, wherein the computer-readable instructions to calculate the temperature change data and the silicon phase change data include instructions to store the temperature change data of the simulation domain and the silicon phase change data of the simulation domain over time in the tetrahedral meshes and to provide the temperature change data and the silicon phase change data.

20. The non-transitory computer-readable recording medium of claim 17, wherein the simulation domain includes an asymmetric structure.

* * * * *